UNITED STATES PATENT OFFICE.

ASA W. WILKINSON, OF NEW YORK, N. Y.

IMPROVEMENT IN DISTILLING PETROLEUM.

Specification forming part of Letters Patent No. 145,707, dated December 16, 1873; application filed July 23, 1873.

*To all whom it may concern:*

Be it known that I, ASA W. WILKINSON, of the city, county, and State of New York, have invented a new and useful Improvement in Distilling Petroleum and other Inflammable Liquids; and I do hereby declare the following to be a full, clear, and exact description thereof, which will enable those skilled in the art to make and use the same.

This invention consists in passing through the liquid contained in the still any gas which will not produce combustion, and will not enter in a deleterious combination with the liquid.

In distilling petroleum, it has been attempted to pass a jet or jets of steam through the body of the liquid in the still, so that by the steam the liquid is agitated, and the vapors formed in the mass of said liquid are readily disengaged and driven out. During this operation, and while the vapors are condensed, the steam becomes intimately mixed with the liquid, and as the same condenses the moisture resulting from such condensation adheres to the product of the distillation, and it can be separated therefrom only with great difficulty.

In order to avoid this disadvantage, and to obtain a pure and unadulterated product of distillation, I use gases, such as carbonic acid, carbonic oxide, hydrogen, light carbureted hydrogen, nitrogen, or the vapor of naphtha; and as these gases, or either of them, are injected into the still and made to pass through the body of the liquid contained therein, the liquid becomes agitated, and the vapors are readily disengaged; and when the vapors condense, the gases, such as carbonic acid, carbonic oxide, hydrogen, or nitrogen, which do not condense under ordinary circumstances, pass off from the condenser, and they can be collected or used over again; or, if the vapors of naphtha or other condensable gases are used, a portion of these vapors mix with the vapors found in the still, and are condensed with the same, without, however, producing a deleterious effect on the product of distillation.

The gases used in this process may be heated, or they may be used at the common temperature. If they are heated, the effect is improved.

Having thus fully described my invention, what I claim as new, and desire to secure by Letters Patent, is—

The within-described process of distilling petroleum, by injecting into and through the liquid mass contained in the still a gas or vapor which will not produce combustion, and will not enter into a deleterious combination with the product of distillation, substantially as set forth.

A. W. WILKINSON.

Witnesses:
E. F. KASTENHUBER,
CHAS. WAHLERS.